UNITED STATES PATENT OFFICE.

ADOLPH FISCHER, OF NEW YORK, N. Y.

IMPROVEMENT IN THE MANUFACTURE OF IMITATION MARBLE.

Specification forming part of Letters Patent No. 124,562, dated March 12, 1872.

*To all whom it may concern:*

Be it known that I, ADOLPH FISCHER, of the city, county, and State of New York, have invented a new and Improved Imitation Marble; and I do hereby declare the following to be a full, clear, and exact description thereof, which will enable those skilled in the art to make and use the same.

This invention consists in an imitation marble, produced by staining thick plates of glass, known as floor plates, on their rough sides with suitable pigments, which, when properly applied to said rough sides, impart to the glass the appearance of marble, while the body of the glass itself, when laid down upon a floor or counter, protects the pigments from injury, and at the same time the glass retains its property to resist the influence of acids or other materials, which, when brought in contact with natural marble, are liable to stain the same and to injure its appearance.

In carrying out my invention I take glass plates of that kind known by the term of floor glass, such plates being made smooth on one side and rough on the other. On the rough sides of these plates I apply pigments of a suitable nature to impart to such glass the appearance of marble, the roughness of the glass itself assisting materially in producing the desired effect. If the pigments are applied to the smooth side of a glass plate it is exceedingly difficult to impart to the article a close resemblance to natural marble; but the roughness in the glass plates which I use produces in the finished article the appearance of fissures like those appearing in natural marble, and when my plates, after having been properly stained, are laid down upon a floor or on a counter or desk, they produce an effect strikingly similar to natural marble; at the same time, by the inherent nature of the glass, my imitation marble is capable of withstanding wear and tear much better than natural marble; and particularly no effect is produced on my imitation marble by acids or other materials, which, when brought in contact with natural marble, produces stains thereon, whereby the appearance of such marble is materially deteriorated.

My imitation marble is of particular advantage for covering counters in druggists' shops, or in places where mineral waters or other liquids are sold, which, when brought in contact with natural marble, injure the same, while my plates will sustain no injury whatever from contact with said liquids or other materials generally sold in the above-named places.

What I claim as new, and desire to secure by Letters Patent, is—

An imitation marble, produced by applying to the rough side of floor glass suitable pigments, substantially as described.

ADOLPH FISCHER.

Witnesses
W. HAUFF,
E. F. KASTENHUBER.